(12) United States Patent
Wang et al.

(10) Patent No.: US 8,667,268 B2
(45) Date of Patent: *Mar. 4, 2014

(54) SCALABLE DISTRIBUTED WEB-BASED AUTHENTICATION

(75) Inventors: Yan-Zhe Wang, Palo Alto, CA (US); Sean Hou, San Jose, CA (US); Sridhar Devarapalli, Santa Clara, CA (US); Louis Yun, Los Altos, CA (US)

(73) Assignee: Foundry Networks, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/461,700

(22) Filed: May 1, 2012

(65) Prior Publication Data

US 2012/0221849 A1      Aug. 30, 2012

Related U.S. Application Data

(63) Continuation of application No. 11/974,838, filed on Oct. 15, 2007, now Pat. No. 8,190,881.

(51) Int. Cl.
*H04L 29/06* (2006.01)
*G06F 21/00* (2013.01)

(52) U.S. Cl.
USPC .............................. 713/153; 713/161; 726/11

(58) Field of Classification Search
None
See application file for complete search history.

(56) References Cited

U.S. PATENT DOCUMENTS

| 4,683,564 | A | 7/1987 | Young et al. |
|---|---|---|---|
| 4,791,629 | A | 12/1988 | Burns et al. |
| 4,807,280 | A | 2/1989 | Posner et al. |
| 4,876,681 | A | 10/1989 | Hagiwara et al. |
| 4,985,889 | A | 1/1991 | Frankish et al. |
| 5,101,404 | A | 3/1992 | Kunimoto et al. |
| 5,195,181 | A | 3/1993 | Bryant et al. |
| 5,301,192 | A | 4/1994 | Henrion |
| 5,307,345 | A | 4/1994 | Lozowick et al. |
| 5,323,386 | A | 6/1994 | Wiher et al. |
| 5,365,512 | A | 11/1994 | Combs et al. |
| 5,386,471 | A | 1/1995 | Bianco |
| 5,390,173 | A | 2/1995 | Spinney et al. |

(Continued)

OTHER PUBLICATIONS

"Technology Overview," 10 Gigabit Ethernet Alliance, Whitepaper, Sep. 2001, 16 pages.

(Continued)

*Primary Examiner* — Gilberto Barron, Jr.
*Assistant Examiner* — Izunna Okeke
(74) *Attorney, Agent, or Firm* — Nixon Peabody LLP; John P. Schaub

(57) ABSTRACT

Web-based authentication includes receiving a packet in a network switch having at least one associative store configured to forward packet traffic to a first one or more processors of the switch that are dedicated to cryptographic processing if a destination port of the packet indicates a secure transport protocol, and to a second one or more processors of the switch that are not dedicated to cryptographic processing if the destination port does not indicate a secure transport protocol. If a source of the packet is an authenticated user, the packet is forwarded via an output port of the switch, based on the associative store. If the source is an unauthenticated user, the packet is forwarded to the first one or more processors if the destination port indicates a secure transport protocol, and to the second one or more processors if the destination port does not indicate a secure transport protocol.

21 Claims, 12 Drawing Sheets

(56) References Cited

U.S. PATENT DOCUMENTS

| | | |
|---|---|---|
| 5,392,279 A | 2/1995 | Taniguchi |
| 5,406,643 A | 4/1995 | Burke et al. |
| 5,408,469 A | 4/1995 | Opher et al. |
| 5,430,442 A | 7/1995 | Kaiser et al. |
| 5,436,893 A | 7/1995 | Barnett |
| 5,461,615 A | 10/1995 | Henrion |
| 5,506,840 A | 4/1996 | Pauwels et al. |
| 5,521,923 A | 5/1996 | Willmann et al. |
| 5,546,385 A | 8/1996 | Caspi et al. |
| 5,550,816 A | 8/1996 | Hardwick et al. |
| 5,598,410 A | 1/1997 | Stone |
| 5,600,795 A | 2/1997 | Du |
| 5,619,497 A | 4/1997 | Gallagher et al. |
| 5,640,504 A | 6/1997 | Johnson, Jr. |
| 5,663,959 A | 9/1997 | Nakagawa et al. |
| 5,666,353 A | 9/1997 | Klausmeier et al. |
| 5,732,080 A | 3/1998 | Ferguson et al. |
| 5,815,146 A | 9/1998 | Youden et al. |
| 5,835,496 A | 11/1998 | Yeung et al. |
| 5,838,684 A | 11/1998 | Wicki et al. |
| 5,862,350 A | 1/1999 | Coulson |
| 5,867,675 A | 2/1999 | Lomelino et al. |
| 5,870,538 A | 2/1999 | Manning et al. |
| 5,872,783 A | 2/1999 | Chin |
| 5,907,566 A | 5/1999 | Benson et al. |
| 5,907,660 A | 5/1999 | Inoue et al. |
| 5,909,686 A | 6/1999 | Muller et al. |
| 5,915,094 A | 6/1999 | Kouloheris et al. |
| 5,936,939 A | 8/1999 | Des Jardins et al. |
| 5,999,528 A | 12/1999 | Chow et al. |
| 6,023,471 A | 2/2000 | Haddock et al. |
| 6,035,414 A | 3/2000 | Okazawa et al. |
| 6,038,288 A | 3/2000 | Thomas et al. |
| 6,076,115 A | 6/2000 | Sambamurthy et al. |
| 6,088,356 A | 7/2000 | Hendel et al. |
| 6,094,434 A | 7/2000 | Kotzur et al. |
| 6,118,787 A | 9/2000 | Kalkunte et al. |
| 6,125,417 A | 9/2000 | Bailis et al. |
| 6,128,666 A | 10/2000 | Muller et al. |
| 6,144,668 A | 11/2000 | Bass et al. |
| 6,151,301 A | 11/2000 | Holden |
| 6,154,446 A | 11/2000 | Kadambi et al. |
| 6,157,643 A | 12/2000 | Ma |
| 6,160,809 A | 12/2000 | Adiletta et al. |
| 6,172,990 B1 | 1/2001 | Deb et al. |
| 6,222,845 B1 | 4/2001 | Shue et al. |
| 6,243,667 B1 | 6/2001 | Kerr et al. |
| 6,272,144 B1 | 8/2001 | Berenbaum et al. |
| 6,320,859 B1 | 11/2001 | Momirov |
| 6,333,929 B1 | 12/2001 | Drottar et al. |
| 6,335,932 B2 | 1/2002 | Kadambi et al. |
| 6,335,935 B2 | 1/2002 | Kadambi et al. |
| 6,343,072 B1 | 1/2002 | Bechtolsheim et al. |
| 6,356,550 B1 | 3/2002 | Williams |
| 6,356,942 B1 | 3/2002 | Bengtsson et al. |
| 6,369,855 B1 | 4/2002 | Chauvel et al. |
| 6,424,658 B1 | 7/2002 | Mathur |
| 6,424,659 B2 | 7/2002 | Viswanadham et al. |
| 6,457,058 B1 | 9/2002 | Ullum et al. |
| 6,477,174 B1 | 11/2002 | Dooley et al. |
| 6,490,280 B1 | 12/2002 | Leung |
| 6,493,347 B2 | 12/2002 | Sindhu et al. |
| 6,567,404 B1 | 5/2003 | Wilford |
| 6,606,300 B1 | 8/2003 | Blanc et al. |
| 6,643,269 B1 | 11/2003 | Fan et al. |
| 6,654,370 B1 | 11/2003 | Quirke et al. |
| 6,658,002 B1 | 12/2003 | Ross et al. |
| 6,671,275 B1 | 12/2003 | Wong et al. |
| 6,681,332 B1 | 1/2004 | Byrne et al. |
| 6,687,247 B1 | 2/2004 | Wilford et al. |
| 6,691,202 B2 | 2/2004 | Vasquez et al. |
| 6,696,917 B1 | 2/2004 | Heitner et al. |
| 6,697,359 B1 | 2/2004 | George |
| 6,697,368 B2 | 2/2004 | Chang et al. |
| 6,700,894 B1 | 3/2004 | Shung |
| 6,721,313 B1 | 4/2004 | Van Duyne |
| 6,735,218 B2 | 5/2004 | Chang et al. |
| 6,751,224 B1 | 6/2004 | Parruck et al. |
| 6,754,881 B2 | 6/2004 | Kuhlmann et al. |
| 6,775,706 B1 | 8/2004 | Fukumoto et al. |
| 6,778,546 B1 | 8/2004 | Epps et al. |
| 6,789,147 B1 | 9/2004 | Kessler et al. |
| 6,792,502 B1 | 9/2004 | Pandya et al. |
| 6,798,740 B1 | 9/2004 | Senevirathne et al. |
| 6,804,731 B1 | 10/2004 | Chang et al. |
| 6,807,363 B1 | 10/2004 | Abiko et al. |
| 6,813,243 B1 | 11/2004 | Epps et al. |
| 6,816,467 B1 | 11/2004 | Muller et al. |
| 6,831,923 B1 | 12/2004 | Laor et al. |
| 6,839,346 B1 | 1/2005 | Kametani |
| 6,842,422 B1 | 1/2005 | Bianchini, Jr. |
| 6,854,117 B1 | 2/2005 | Roberts |
| 6,865,153 B1 | 3/2005 | Hill et al. |
| 6,901,072 B1 | 5/2005 | Wong |
| 6,920,154 B1 | 7/2005 | Aschler |
| 6,925,516 B2 | 8/2005 | Struhsaker et al. |
| 6,937,606 B2 | 8/2005 | Basso et al. |
| 6,957,258 B2 | 10/2005 | Maher, III et al. |
| 7,023,863 B1 | 4/2006 | Naudus et al. |
| 7,187,687 B1 | 3/2007 | Davis et al. |
| 7,203,194 B2 | 4/2007 | Chang et al. |
| 7,206,283 B2 | 4/2007 | Chang et al. |
| 7,240,203 B2 | 7/2007 | Kessler et al. |
| 7,266,117 B1 | 9/2007 | Davis |
| 7,305,567 B1 | 12/2007 | Hussain et al. |
| 7,337,314 B2 | 2/2008 | Hussain et al. |
| 7,382,725 B1* | 6/2008 | Kakadia ................. 370/230 |
| 7,398,386 B2 | 7/2008 | Kessler et al. |
| 7,468,975 B1 | 12/2008 | Davis et al. |
| 7,649,885 B1 | 1/2010 | Davis et al. |
| 7,657,933 B2 | 2/2010 | Hussain et al. |
| 7,661,130 B2 | 2/2010 | Hussain et al. |
| 7,738,450 B1 | 6/2010 | Davis et al. |
| 7,814,310 B2 | 10/2010 | Bouchard et al. |
| 7,895,431 B2 | 2/2011 | Bouchard et al. |
| 2001/0048785 A1 | 12/2001 | Steinberg |
| 2001/0053150 A1 | 12/2001 | Clear et al. |
| 2002/0007415 A1 | 1/2002 | Douglis et al. |
| 2002/0012585 A1 | 1/2002 | Kalkunte et al. |
| 2002/0054594 A1 | 5/2002 | Hoof et al. |
| 2002/0069294 A1 | 6/2002 | Herkersdorf et al. |
| 2002/0089977 A1 | 7/2002 | Chang et al. |
| 2002/0091884 A1 | 7/2002 | Chang et al. |
| 2002/0097713 A1 | 7/2002 | Chang et al. |
| 2002/0105966 A1 | 8/2002 | Patel et al. |
| 2003/0009466 A1 | 1/2003 | Ta et al. |
| 2003/0033435 A1 | 2/2003 | Hanner |
| 2003/0043800 A1 | 3/2003 | Sonksen et al. |
| 2003/0043825 A1* | 3/2003 | Magnussen et al. ......... 370/401 |
| 2003/0048785 A1 | 3/2003 | Calvignac et al. |
| 2003/0152084 A1 | 8/2003 | Lee et al. |
| 2003/0165160 A1 | 9/2003 | Minami et al. |
| 2003/0174719 A1 | 9/2003 | Sampath et al. |
| 2003/0177221 A1 | 9/2003 | Ould-Brahim et al. |
| 2003/0215029 A1 | 11/2003 | Limberg |
| 2004/0022263 A1 | 2/2004 | Zhao et al. |
| 2004/0179548 A1 | 9/2004 | Chang et al. |
| 2005/0041684 A1 | 2/2005 | Reynolds et al. |
| 2005/0089049 A1 | 4/2005 | Chang et al. |
| 2005/0175018 A1 | 8/2005 | Wong |
| 2008/0052773 A1* | 2/2008 | Samprathi et al. ............. 726/13 |
| 2009/0100500 A1 | 4/2009 | Wang |
| 2009/0279558 A1 | 11/2009 | Davis et al. |
| 2010/0131658 A1 | 5/2010 | Goyal et al. |

OTHER PUBLICATIONS

Brand, R., "Interconnection with Wide Area Networks," 10 Gigabit Ethernet Alliance, Version 1.0, Mar. 2002, 5 pages.

Degermark, M. et al., "Small Forwarding Tables for Fast Routing Lookups," ACM Computer Communications Review, vol. 27, No. 4, Oct. 1997, 12 pages.

"BigIron Architecture Technical Brief," Foundry Networks, Version 1.0, Oct. 1998, 15 pages.

(56) References Cited

OTHER PUBLICATIONS

"BigIron Architecture Technical Brief," Foundry Networks, Version 1.02, Oct. 1998, 15 pages.
"BigIron Architecture Technical Brief," Foundry Networks, Version 1.03, Dec. 1998, 14 pages.
"BigIron Architecture Technical Brief," Foundry Networks, Version 2.0, May 1999, 15 pages.
"BigIron Architecture Technical Brief," Foundry Networks, Version 2.01, May 1999, 15 pages.
"BigIron Architecture Technical Brief," Foundry Networks, Version 2.02, Jul. 2001, 16 pages.
"Next Generation Terabit System Architecture •The High Performance Revolution for 10 Gigabit Networks," Foundry Networks, Nov. 17, 2003, 27 pages.
"Accelerating the Standard for Speed," Gigabit Ethernet Alliance, Whitepaper, 1998, 19 pages.
Kichorowsky, R., et al., "Mindspeed.TM. Switch Fabric Offers the Most Comprehensive Solution for Multi-Protocol Networking Equipment," Apr. 30, 2001, 3 pages.
Matsumoto, C. et al., "Switch Fabrics Touted At Interconnects Conference," Aug. 21, 2000, URL: http://www.eetimes.comistory/OEG20000821S0011, accessed Aug. 12, 2002, 2 pages.
McAuley, A., et al., "Fast Routing Table Lookup Using CAMs," Proceedings of INFOCOM, Mar.-Apr. 1993, pp. 1382-1391.
"JetCore Based Chassis Systems—An Architecture Brief on NetIron, BigIron, and FastIron Systems," Foundry Networks, Jan. 17, 2003, 27 pages.
"Lab Testing Summary Report-Product Category: Layer-3 Switches, Vendor Tested: Foundry Networks, Product Tested: BigIron 4000," Mier Communications, Inc., Report No. 231198, Oct. 1998, 6 pages.
Mier Communications, Inc.,"Lab Testing Summary Report-Product Category: Gigabit Backbone Switches, Vendor Tested: Foundry Networks, Product Tested: BigIron 4000," Report No. 210998, Sep. 1998, 6 pages.
"Switch Fabric Chipset-X27300 iScale.TM.," Mindspeed, Apr. 30, 2001, 2 pages.
"17×17 3.2 Gbps Crosspoint Switch with Input Equalization-M21110," Mindspeed, Feb. 1, 2001, 2 pages.
"Foundry Networks, Inc.—BigIron 4000, Layer 2 & Layer 3 Interoperability Evaluation," The Tolly Group, No. 199133, Oct. 1999, 4 pages.
"Foundry Networks, Inc.—BigIron 8000 Gigabit Ethernet Switching Router, Layer 2 & Layer 3 Performance Evaluation," The Tolly Group, No. 199111, May, 1999, 4 pages.
"Nitrox III Family of Security Processors," CAVIUM Networks, Security Processors, Product Brief, 2011, 2 pages.
"Nitrox PX Family of Security Processors," CAVIUM Networks, Security Processors, Product Brief, 2008, 2 pages.
Office Action in U.S. Appl. No. 11/974,838, mailed Apr. 1, 2011.
Office Action in U.S. Appl. No. 11/974,838, mailed Aug. 15, 2011.
Office Action in U.S. Appl. No. 11/974,838, mailed Sep. 28, 2010.
Office Action in U.S. Appl. No. 11/974,838, mailed Nov. 28, 2011.
Notice of Allowance in U.S. Appl. No. 11/974,838, mailed Apr. 12, 2012.
U.S. Appl. No. 10/140,751, filed May 6, 2002.
U.S. Appl. No. 10/140,753, filed May 6, 2002.
Office Action in U.S. Appl. No. 13/458,979, mailed Feb. 4, 2013.
Office Action in U.S. Appl. No. 13/458,979, mailed Oct. 23, 2013.

* cited by examiner

SCALABLE DISTRIBUTED WEB-BASED AUTHENTICATION

CROSS REFERENCE TO RELATED APPLICATIONS

This application is a continuation of prior U.S. patent application Ser. No. 11/974,838, entitled "Scalable Distributed Web-Based Authentication," filed Oct. 15, 2007, in the name of the same inventors and commonly owned herewith.

This application is also related to U.S. patent application Ser. No. 13/458,979, entitled "Scalable Distributed Web-Based Authentication," filed Apr. 27, 2012.

FIELD OF THE INVENTION

The present invention relates to the field of computer science. More particularly, the present invention relates to scalable distributed Web-based authentication.

BACKGROUND OF THE INVENTION

An enterprise network may provide access to sensitive proprietary data and critical resources. Authentication is used to prevent unauthorized users from accessing enterprise resources. Examples of such enterprise resources include access to the intranet, access to the Internet, and access to a data center.

Web-based user authentication uses a combination of existing technologies, including Web browsers, Web content servers and secure and non-secure Internet communications protocols. Typically, a user attempting to access network resources for the first time is challenged for a user login name and password. A secure communication transport protocol, such as Secure Sockets Layer (SSL), is first established to transmit user credentials. An Authentication, Authorization and Accounting (AAA) protocol such as Remote Authentication Dial In User Service (RADIUS) or Lightweight Directory Access Protocol (LDAP) is typically used to authenticate the credentials.

Web-based user authentication solutions are typically single-processor-based. As such, both plaintext and encrypted traffic are handled by the same processor, which can lead to both inefficient CPU usage and compromised handling of other critical network traffic. In addition, such solutions are typically ill-equipped to handle processor failures and cannot scale easily to handle additional users, particularly in multi-VLAN (Virtual Local Area Network) enterprise network environments. Accordingly, a need exists in the art for an improved solution for Web-based user authentication.

SUMMARY OF THE INVENTION

Web-based authentication includes receiving a packet in a network switch having at least one associative store configured to forward packet traffic to a first one or more processors of the switch that are dedicated to cryptographic processing if a destination port of the packet indicates a secure transport protocol, and to a second one or more processors of the switch that are not dedicated to cryptographic processing if the destination port does not indicate a secure transport protocol. If a source of the packet is an authenticated user, the packet is forwarded via an output port of the switch, based on the associative store. If the source is an unauthenticated user, the packet is forwarded to the first one or more processors if the destination port indicates a secure transport protocol, and to the second one or more processors if the destination port does not indicate a secure transport protocol.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
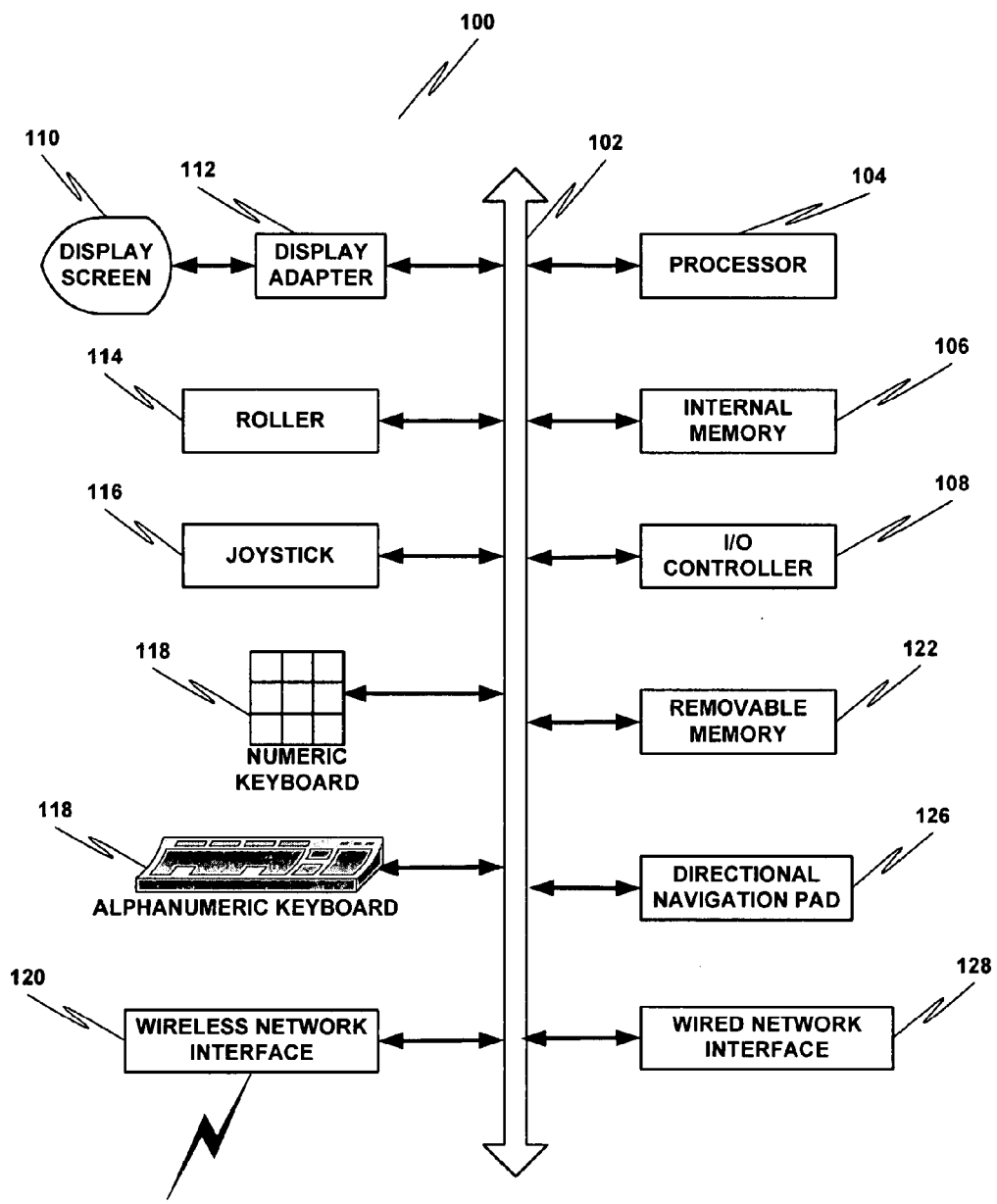
FIG. 1 is a block diagram of a computer system suitable for implementing aspects of the present invention.

Embodiments of the present invention are described herein in the context of scalable distributed Web-based authentication. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present invention, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general-purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "network" includes local area networks (LANs), wide area networks (WANs), metro area networks, residential networks, corporate networks, inter-networks, the Internet, the World Wide Web, cable television systems, telephone systems, wireless telecommunications systems, fiber optic networks, token ring networks, Ethernet networks, ATM networks, frame relay networks, satellite communications systems, and the like. Such networks are well known in the art and consequently are not further described here.

In the context of the present invention, the term "identifier" describes an ordered series of one or more numbers, characters, symbols, or the like. More generally, an "identifier" describes any entity that can be represented by one or more bits.

In the context of the present invention, the term "distributed" describes a digital information system dispersed over multiple computers and not centralized at a single location.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present invention, the term "data store" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

In the context of the present invention, the term "network interface" describes the means by which users access a network for the purposes of communicating across it or retrieving information from it.

In the context of the present invention, the term "Web server" describes a computer system that stores and/or serves Web pages and/or data ready for access by other computers.

In the context of the present invention, the term "system" describes any computer information and/or control device, devices or network of devices, of hardware and/or software, comprising processor means, data storage means, program means, and/or user interface means, which is adapted to communicate with the embodiments of the present invention, via one or more data networks or connections, and is adapted for use in conjunction with the embodiments of the present invention.

In the context of the present invention, the term "user authentication" describes the verification of the digital identity of the sender of a communication such as a request to log in.

In the context of the present invention, the term "associative store" describes a component configured to search a data store to determine whether a received data word is stored anywhere in the data store. If the data word is found, the associative store returns a list of one or more storage addresses where the data word was found. The associative store optionally returns the data word, or other associated data. An associative store may be a content-addressable memory (CAM), also known as an associative memory. Alternatively, an associative store may be based on a linear table search or a binary table search.

Example embodiments of the present invention provide a method and system for Web-based authentication for use in a multiprocessor edge switch or aggregation layer switch. An edge switch solution can be used to block an unauthorized user at the outermost periphery of an enterprise network. An aggregation switch solution achieves economy of scale by centralizing the task authentication of multiple users in a single network device.

Example embodiments of the present invention use a multiprocessor network switch architecture to efficiently forward packet traffic within the network switch based on one or more of traffic load, traffic type, and the computing capabilities of particular processors. Traffic load may be determined based on a client Internet Protocol (IP) address. Traffic type may include an indication of whether the packet traffic is plaintext or encrypted. The computing capabilities of a processor may include an indication of whether the processor has cryptographic encoding resources, cryptographic decoding resources, or both.

Example embodiments of the present invention forward encrypted traffic to one set of processors and unencrypted traffic to another set of processors, thereby removing cryptographic key processing as a bottleneck in Web-authentication processing and increasing Web-authentication throughput while minimizing any impact on packet forwarding of traffic not subject to Web-based authentication.

According to one embodiment of the present invention, traffic distribution in a multi-processor network switch is achieved by extracting fields of interest from a received packet and performing a lookup based on the extracted fields. The lookup may be done using an associative store. The associative store is configured to forward traffic whose destination IP address is associated with the multi-processor network switch and whose destination port indicates a secure communication transport protocol such as SSL to one or more processors dedicated to cryptographic processing, and all other traffic to one or more processors not dedicated to cryptographic processing. To evenly forward the traffic among multiple processors of the same type, user IP address hashing is used in processor selection so that packet traffic of the same type from the same user is directed to the same processor.

FIG. 1 depicts a block diagram of a computer system 100 suitable for implementing aspects of the present invention. As shown in FIG. 1, system 100 includes a bus 102 which interconnects major subsystems such as a processor 104, an internal memory 106 (such as a RAM), an input/output (I/O) controller 108, a removable memory (such as a memory card) 122, an external device such as a display screen 110 via display adapter 112, a roller-type input device 114, a joystick 116, a numeric keyboard 118, an alphanumeric keyboard 118, directional navigation pad 126 and a wireless interface 120. Many other devices can be connected. Wireless network interface 120, wired network interface 128, or both, may be used to interface to a local or wide area network (such as the Internet) using any network interface system known to those skilled in the art.

Many other devices or subsystems (not shown) may be connected in a similar manner. Also, it is not necessary for all of the devices shown in FIG. 1 to be present to practice the present invention. Furthermore, the devices and subsystems may be interconnected in different ways from that shown in FIG. 1. Code to implement the present invention may be operably disposed in internal memory 106 or stored on storage media such as removable memory 122, a floppy disk, a thumb drive, a CompactFlash® storage device, a DVD-R ("Digital Versatile Disc" or "Digital Video Disc" recordable), a DVD-ROM ("Digital Versatile Disc" or "Digital Video Disc" read-only memory), a CD-R (Compact Disc-Recordable), or a CD-ROM (Compact Disc read-only memory).

Figure 2:
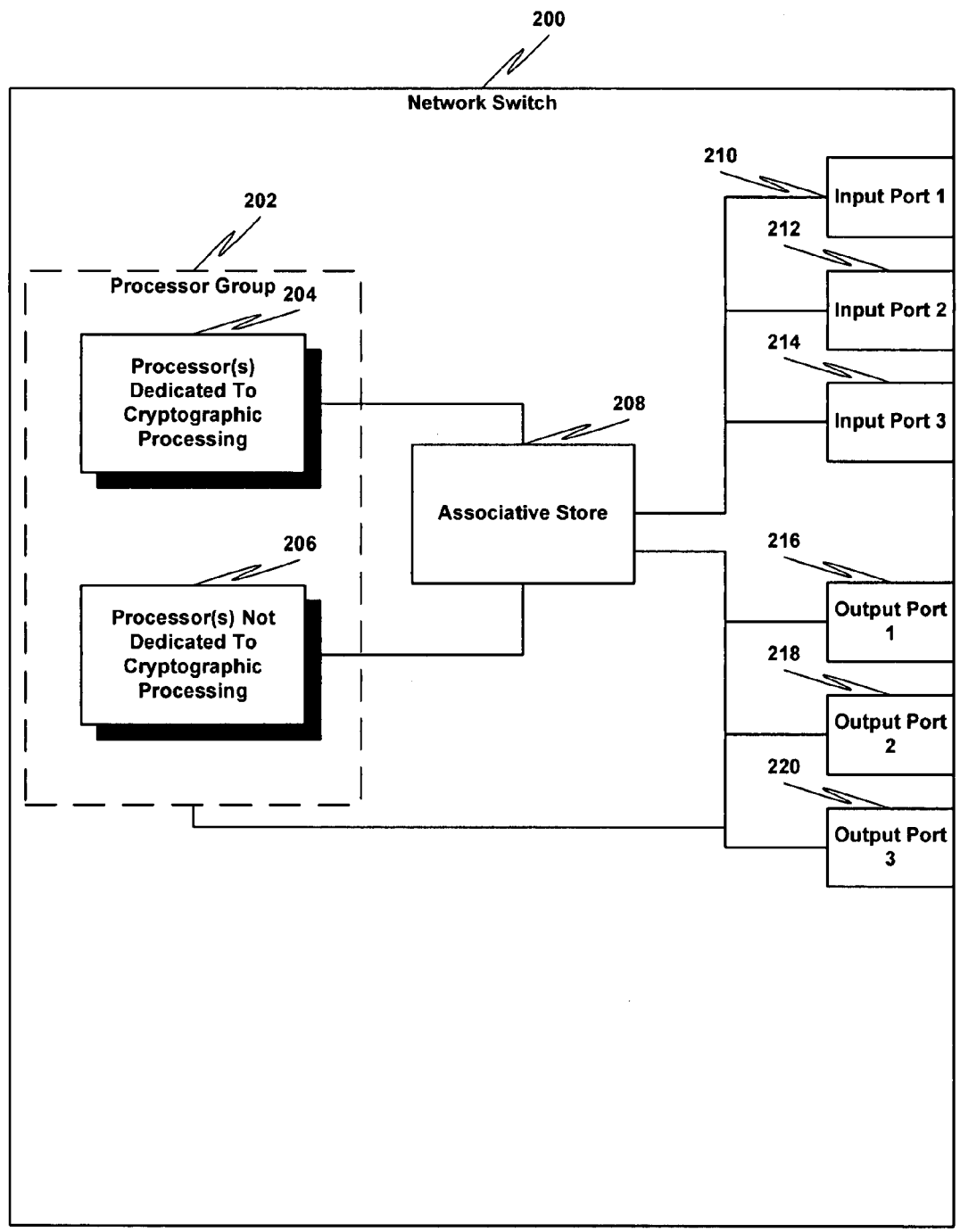
FIG. 2 is a block diagram that illustrates a scalable distributed architecture for Web-based authentication in accordance with one embodiment of the present invention.

FIG. 2 is a block diagram that illustrates a scalable distributed architecture for Web-based authentication in accordance with one embodiment of the present invention. As shown in FIG. 2, network switch 200 comprises an associative store 208, one or more input ports (210-214), one or more output ports (216-220), and a processor group 202 comprising one or more processors dedicated to cryptographic processing 204 and one or more processors not dedicated to cryptographic processing 206. Input ports 210-214 are coupled to associative store 208 and configured to receive one or more packets on a packet-switched network. Output ports 216-220 are coupled to processor group 202 and associative store 208 and are configured to send one or more packets to the packet-switched network. Associative store 208 is configured to forward packet traffic to the one or more processors dedicated to cryptographic processing 204 if the destination port of the received packets indicates a secure communication transport protocol, such as SSL. Associative store 208 is further configured to forward packet traffic from the network switch 200 to the one or more processors not dedicated to cryptographic processing 206 if the destination port of the received packets does not indicate a secure communication transport protocol. Associative store 208 is further configured to forward packets directly from one of input ports 210-214 if the packets are from a user device that has been authenticated.

Still referring to FIG. 2, the one or more processors dedicated to cryptographic processing 204 are configured to perform cryptographic processing on packets, and the one or more processors not dedicated to cryptographic processing 206 are configured to perform non-cryptographic processing on the packets. One of the one or more processors not dedicated to cryptographic processing 206 is further configured to control networking functions other than forwarding, such as user authentication, Dynamic Host Configuration Protocol (DHCP) snooping, user entry table creation, deletion, and associative store entry aging, user device address (e.g. Media Access Control (MAC) address) learning, Web server IP address management, and the like, and to perform inter-processor synchronization to update the other processors with current information.

Figure 3:
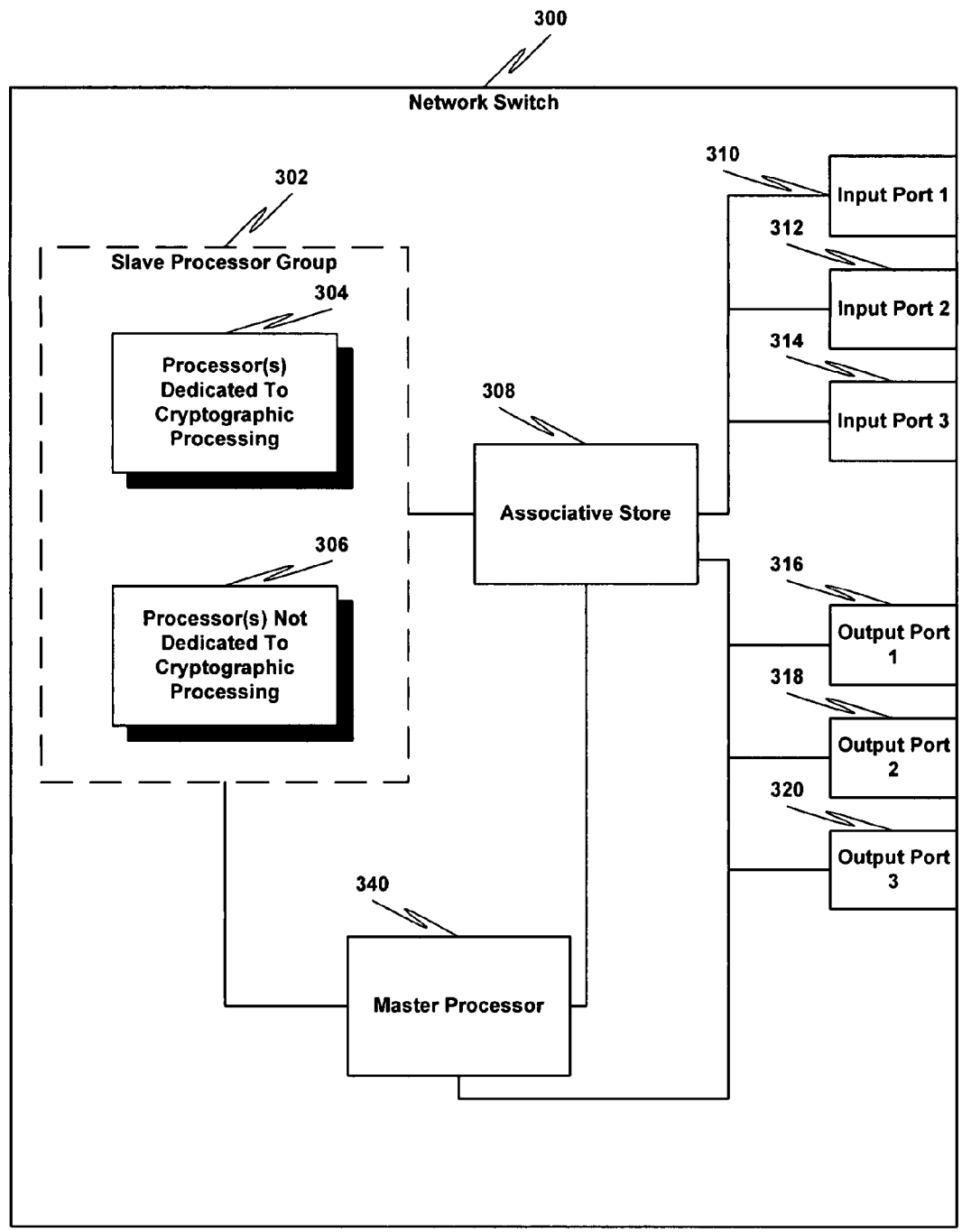
FIG. 3 is a block diagram that illustrates a scalable distributed architecture for Web-based authentication in accordance with one embodiment of the present invention.

FIG. 3 is a block diagram that illustrates a scalable distributed architecture for Web-based authentication in accordance with one embodiment of the present invention. FIG. 3 is similar to FIG. 2, except FIG. 3 includes a master processor 340 configured to control networking functions other than forwarding, such as user authentication, Dynamic Host Configuration Protocol (DHCP) snooping, user entry table creation, synchronization, deletion, and associative store entry aging, user device address (e.g. Media Access Control (MAC) address) learning, Web server IP address management, and the like.

As shown in FIG. 3, network switch 300 comprises an associative store 308, one or more input ports (310-314), one or more output ports (316-320), a slave processor group 302 comprising one or more processors dedicated to cryptographic processing 304 and one or more processors not dedicated to cryptographic processing 306. Network switch 300 also comprises a master processor 340. Input ports 310-314 are coupled to associative store 308 and configured to receive one or more packets on a packet-switched network. Output ports 316-320 are coupled to master processor 340 and are configured to send one or more packets to the packet-switched network. Associative store 308 is configured to forward packet traffic to the one or more processors dedicated to cryptographic processing 304 if the destination port of the received packets indicates a secure communication transport protocol, such as SSL. Associative store 308 is further configured to forward packet traffic from the network switch 300 to the one or more processors not dedicated to cryptographic processing 306 if the destination port of the received packets does not indicate a secure communication transport protocol. Associative store 308 is further configured to forward packets directly from one of input ports 310-314 if the packets are from a user device that has been authenticated. The one or more processors dedicated to cryptographic processing 304 are configured to perform cryptographic processing on packets, and the one or more processors not dedicated to cryptographic processing 306 are configured to perform non-cryptographic processing on the packets. Master processor 340 is configured to control networking functions other than forwarding, such as user authentication, Dynamic Host Configuration Protocol (DHCP) snooping, user entry table creation, deletion, and associative store entry aging, user device address (e.g. Media Access Control (MAC) address) learning, Web server IP address management, and the like, and to perform inter-processor synchronization to update the other processors 302 with current information.

Figure 4:
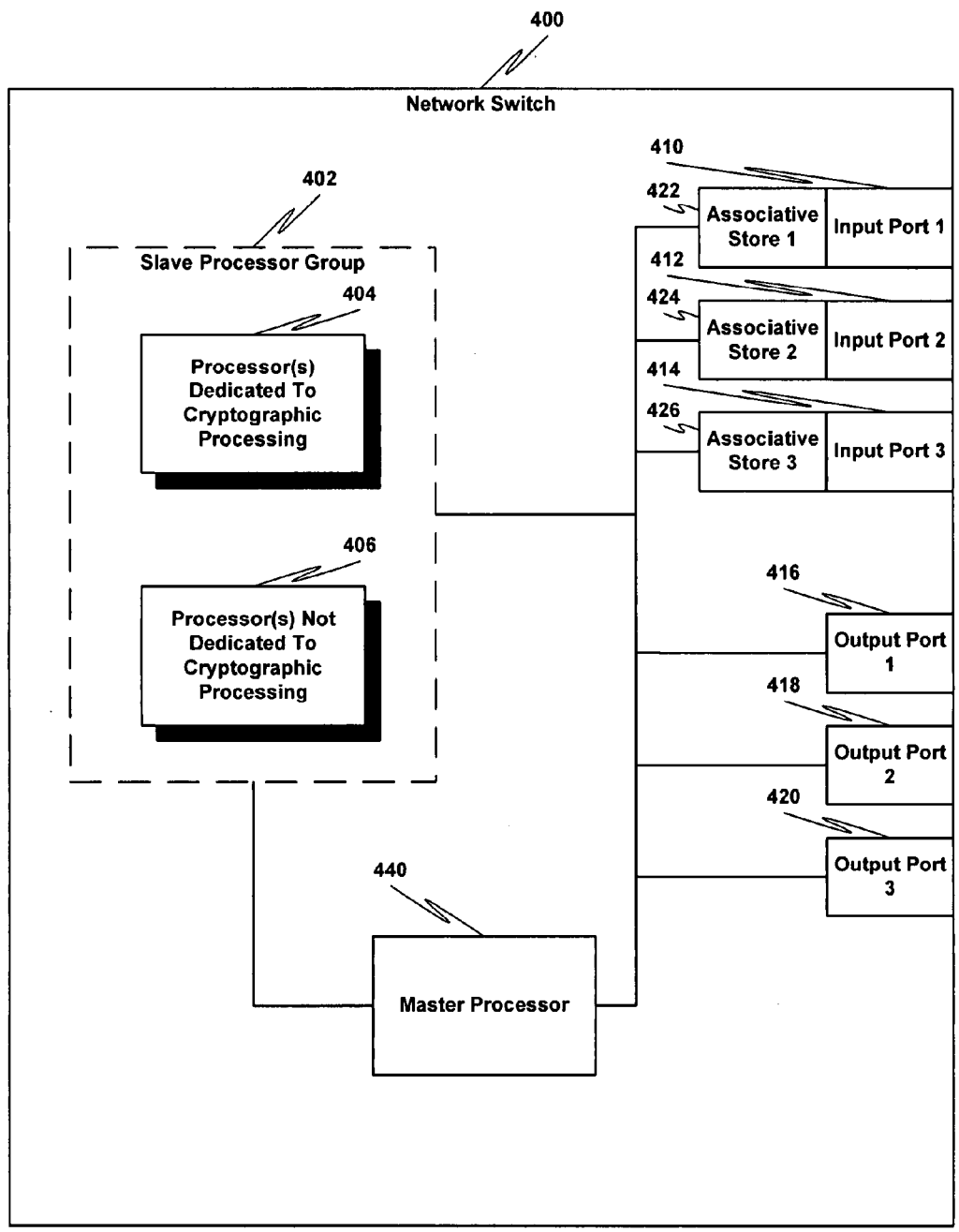
FIG. 4 is a block diagram that illustrates a scalable distributed architecture for Web-based authentication in accordance with one embodiment of the present invention.

FIG. 4 is a block diagram that illustrates a scalable distributed architecture for Web-based authentication in accordance with one embodiment of the present invention. FIG. 4 is similar to FIG. 3, except FIG. 4 includes an associative store for each input port of the network switch 400; associative stores 422-426 are associated with input ports 410-414, respectively.

As shown in FIG. 4, network switch 400 comprises one or more input ports (410-414), an associative store (422-426) for each input port (410-414), one or more output ports (416-420), and a slave processor group 402 comprising one or more processors dedicated to cryptographic processing 404 and one or more processors not dedicated to cryptographic processing 406. Network switch 400 also comprises a master processor 440. A table such as a hash table may be used in lieu of one or more of associative stores 422-426. Input ports 410-414 are coupled to associative stores 422-426, respectively, and are configured to receive one or more packets on a packet-switched network. Output ports 416-420 are coupled to master processor 440 and are configured to send one or more packets to the packet-switched network. Associative stores 422-426 are configured to forward packet traffic to the one or more processors dedicated to cryptographic processing 404 if the destination port of the received packets indicates a secure communication transport protocol, such as SSL. Associative stores 422-426 are further configured to forward packet traffic from the network switch 400 to the one or more processors not dedicated to cryptographic processing 406 if the destination port of the received packets does not indicate a secure communication transport protocol.

Still referring to FIG. 4, the one or more processors dedicated to cryptographic processing 404 are configured to perform cryptographic processing on packets, and the one or more processors not dedicated to cryptographic processing 406 are configured to perform non-cryptographic processing on the packets. Master processor 440 is configured to control networking functions other than forwarding, such as user authentication, Dynamic Host Configuration Protocol (DHCP) snooping, user entry table creation, deletion, and associative store entry aging, user device address (e.g. Media Access Control (MAC) address) learning, Web server IP address management, and the like, and to perform inter-processor synchronization to update the other processors 402 with current information. Master processor 440 is further configured to enable forwarding packets directly from an input port to an output port if the packets are from a user device that has been authenticated.

Figure 5:
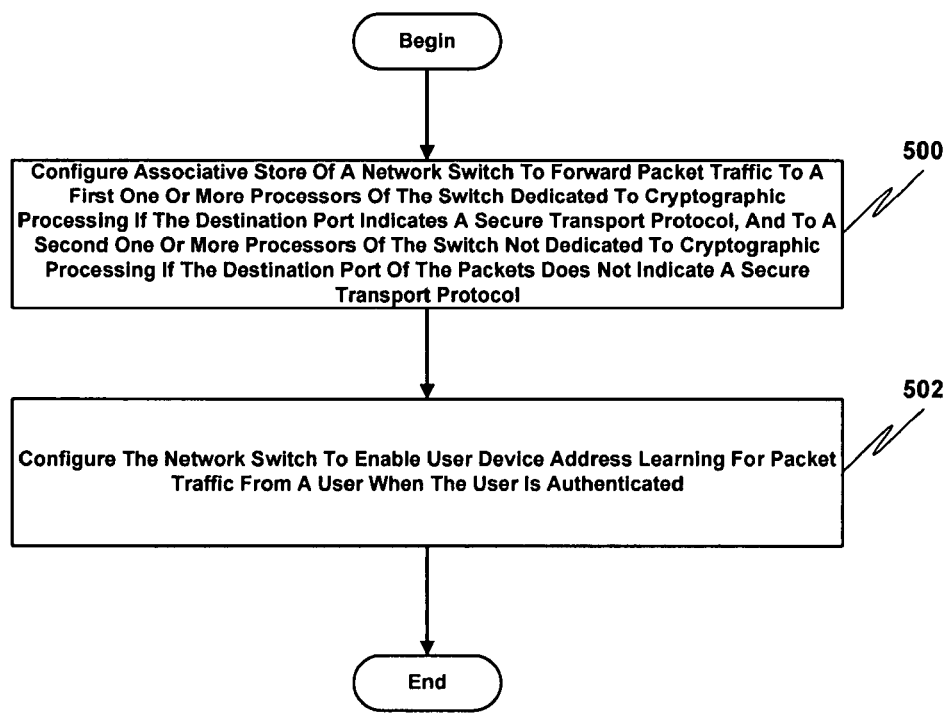
FIG. 5 is a flow diagram that illustrates a method for Web-based authentication in accordance with one embodiment of the present invention.

FIG. 5 is a flow diagram that illustrates a method for Web-based authentication in accordance with one embodiment of the present invention. The processes illustrated in FIG. 5 may be implemented in hardware, software, firmware, or a combination thereof. According to one embodiment of the present invention, the processes illustrated in FIG. 5 are performed by the network switch illustrated in FIG. 2. According to another embodiment of the present invention, the processes illustrated in FIG. 5 are performed by the network switch illustrated in FIG. 3. According to another embodiment of the present invention, the processes illustrated in FIG. 5 are performed by the network switch illustrated in FIG. 4.

Still referring to FIG. 5, at 500, one or more associative stores of a network switch are configured to forward packet traffic to a first one or more processors of the switch dedicated to cryptographic processing if the destination port of the packets indicates a secure transport protocol, and to a second one or more processors of the switch not dedicated to cryptographic processing if the destination port of the packets does not indicate a secure transport protocol. At 502, the network switch is configured to enable forwarding packets directly from an input port to an output port if the packets are from a user device that has been authenticated.

Figure 6:
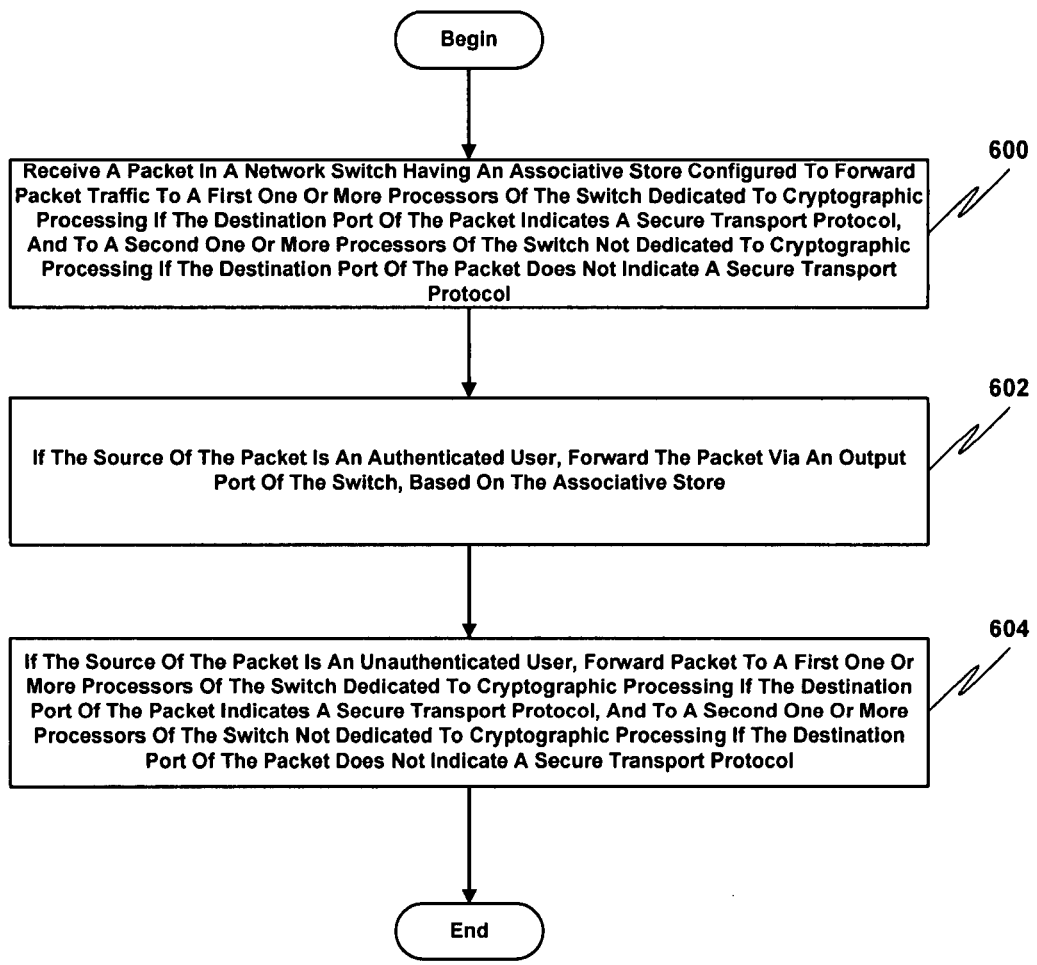
FIG. 6 is a flow diagram that illustrates a method for Web-based authentication in accordance with one embodiment of the present invention.

FIG. 6 is a flow diagram that illustrates a method for Web-based authentication in accordance with one embodiment of the present invention. The processes illustrated in FIG. 6 may be implemented in hardware, software, firmware, or a combination thereof. According to one embodiment of the present invention, the processes illustrated in FIG. 6 are performed by the network switch illustrated in FIG. 2. According to another embodiment of the present invention, the processes illustrated in FIG. 6 are performed by the network switch illustrated in FIG. 3. According to another embodiment of the present invention, the processes illustrated in FIG. 6 are performed by the network switch illustrated in FIG. 4.

Still referring to FIG. 6, at 600, a packet is received in a network switch having an associative store configured to forward packet traffic to a first one or more processors of the switch dedicated to cryptographic processing if the destination port indicates a secure transport protocol, and to a second one or more processors of the switch not dedicated to cryptographic processing if the destination port of the packets does not indicate a secure transport protocol. At 602, if the source of the packet is an authenticated user, the packet is forwarded via an output port of the switch, based on the associative store. The source of a packet may be indicated by the user device address. An authenticated user may be indicated by a match when the user device address is used in a table lookup, or a "hit" when the user device address is used as key for a associative store associated with the input port of the network switch that received the packet. At 604, if the source of the packet is an unauthenticated user, the packet is forwarded to a first one or more processors of the switch dedicated to cryptographic processing if the destination port of the packets indicates a secure transport protocol, and to a second one or more processors of the switch not dedicated to cryptographic processing if the destination port of the packet does not indicate a secure transport protocol.

Figure 7:
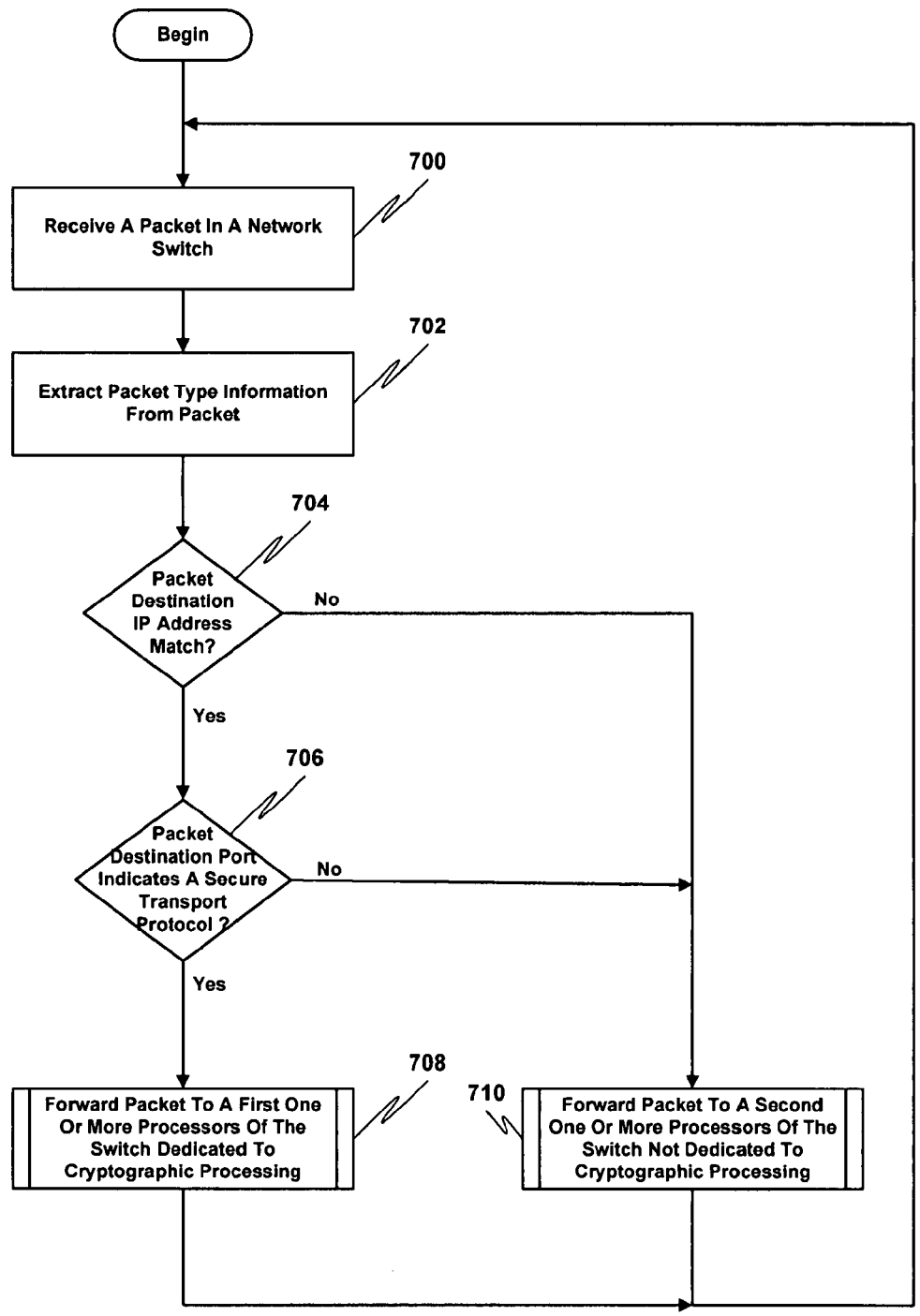
FIG. 7 is a flow diagram that illustrates a method for Web-based authentication in accordance with one embodiment of the present invention.

FIG. 7 is a flow diagram that illustrates a method for Web-based authentication in accordance with one embodiment of the present invention. The processes illustrated in FIG. 7 may be implemented in hardware, software, firmware, or a combination thereof. According to one embodiment of the present invention, the processes illustrated in FIG. 7 are performed by the network switch illustrated in FIG. 2. According to another embodiment of the present invention, the processes illustrated in FIG. 7 are performed by the network switch illustrated in FIG. 3. According to another embodiment of the present invention, the processes illustrated in FIG. 7 are performed by the network switch illustrated in FIG. 4.

Still referring to FIG. 7, at 700, a packet is received in a network switch. At 702, packet type information is extracted from the packet. Example packet type information includes packet destination IP address, packet destination port, and packet source device address. At 704, a determination is made regarding whether the packet destination IP address matches the IP address of the switch. If the packet destination IP address matches the IP address of the switch, at 706 a determination is made regarding whether the packet destination port indicates a secure transport protocol. If the packet destination port indicates a secure transport protocol, at 708, the packet is forwarded to a first one or more processors of the switch dedicated to cryptographic processing. If at 706 the packet destination port does not indicate a secure transport protocol, at 710, the packet is forwarded to a second one or more processors of the switch not dedicated to cryptographic processing.

Figure 8:
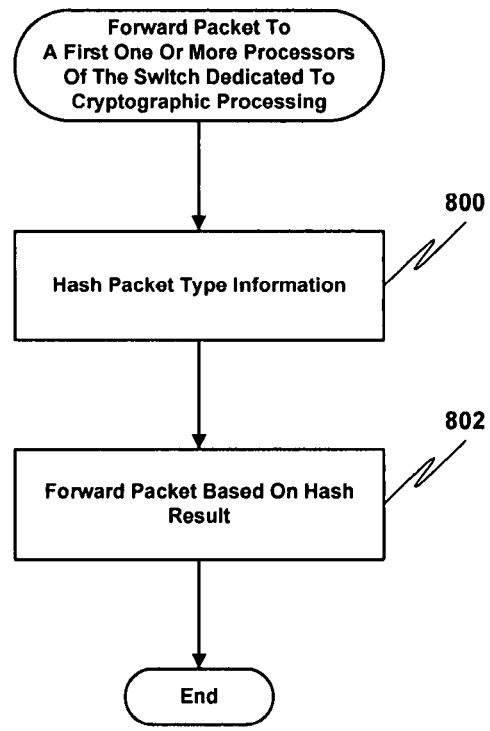
FIG. 8 is a flow diagram that illustrates a method for forwarding a packet to a first one or more processors of a switch dedicated to cryptographic processing in accordance with one embodiment of the present invention.

FIG. 8 is a flow diagram that illustrates a method for forwarding a packet to a first one or more processors of a switch dedicated to cryptographic processing in accordance with one embodiment of the present invention. The processes illustrated in FIG. 8 may be implemented in hardware, software, firmware, or a combination thereof. FIG. 8 provides more detail for reference numeral 708 of FIG. 8. At 800, the packet type information is hashed. At 802, the packet is forwarded based on the hash result.

Figure 9A:
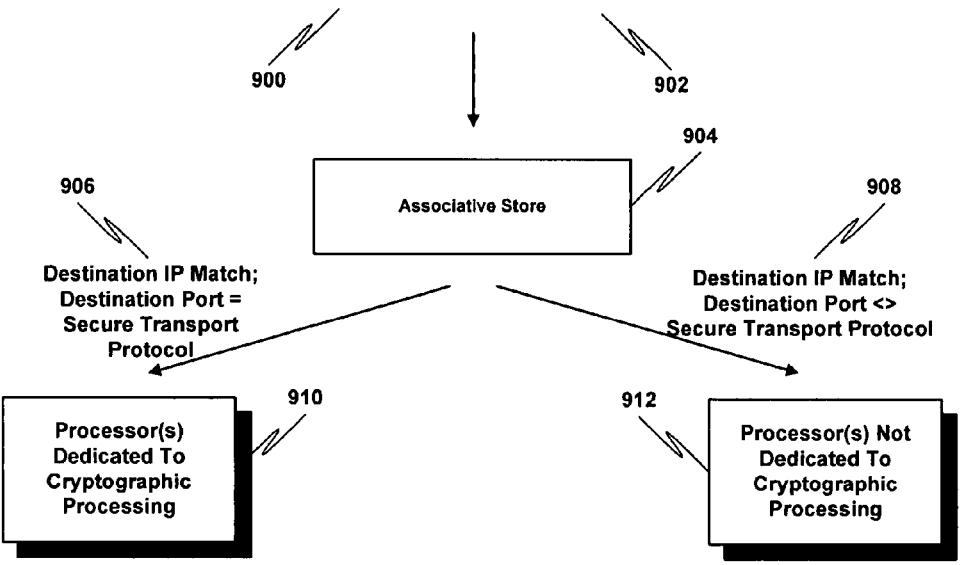
FIG. 9A is a block diagram that illustrates a method for forwarding a packet to a first one or more processors of a switch dedicated to cryptographic processing in accordance with one embodiment of the present invention.

FIG. 9A is a block diagram that illustrates a method for forwarding a packet to a first one or more processors of a switch dedicated to cryptographic processing in accordance with one embodiment of the present invention. As shown in FIG. 9A, if the destination IP address 900 matches the IP address of the network switch, the packet is forwarded to one or more processors dedicated to cryptographic processing 910 at 906 if the destination port of the packet indicates a secure transport protocol. If the destination IP address 900 matches the IP address of the network switch, the packet is forwarded to one or more processors not dedicated to cryptographic processing 912 at 908 if the destination port of the packet does not indicate a secure transport protocol.

Figure 9B:
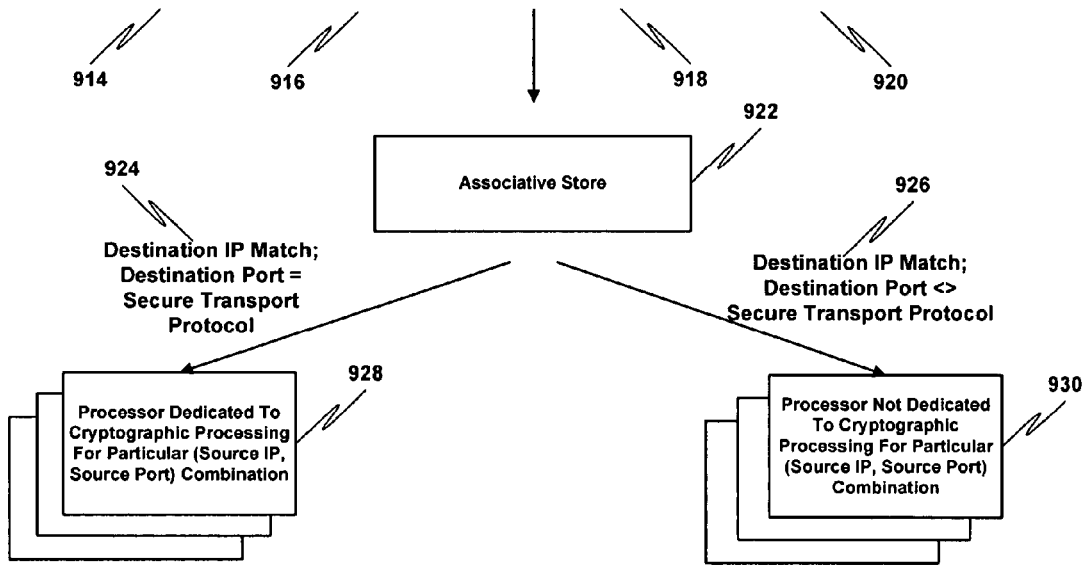
FIG. 9B is a block diagram that illustrates a method for forwarding a packet to a first one or more processors of a switch dedicated to cryptographic processing in accordance with one embodiment of the present invention.

FIG. 9B is a block diagram that illustrates a method for forwarding a packet to a first one or more processors of a switch dedicated to cryptographic processing in accordance with one embodiment of the present invention. As shown in FIG. 9B, if the destination IP address 916 matches the IP address of the network switch, at 924 the packet is forwarded to a particular processor dedicated to cryptographic processing 928 if the destination port of the packet indicates a secure transport protocol. If the destination IP address 916 matches the IP address of the network switch, the packet is forwarded to a particular processor not dedicated to cryptographic processing 930 at 926 if the destination port of the packet is not does not indicate a secure transport protocol.

Figure 10:
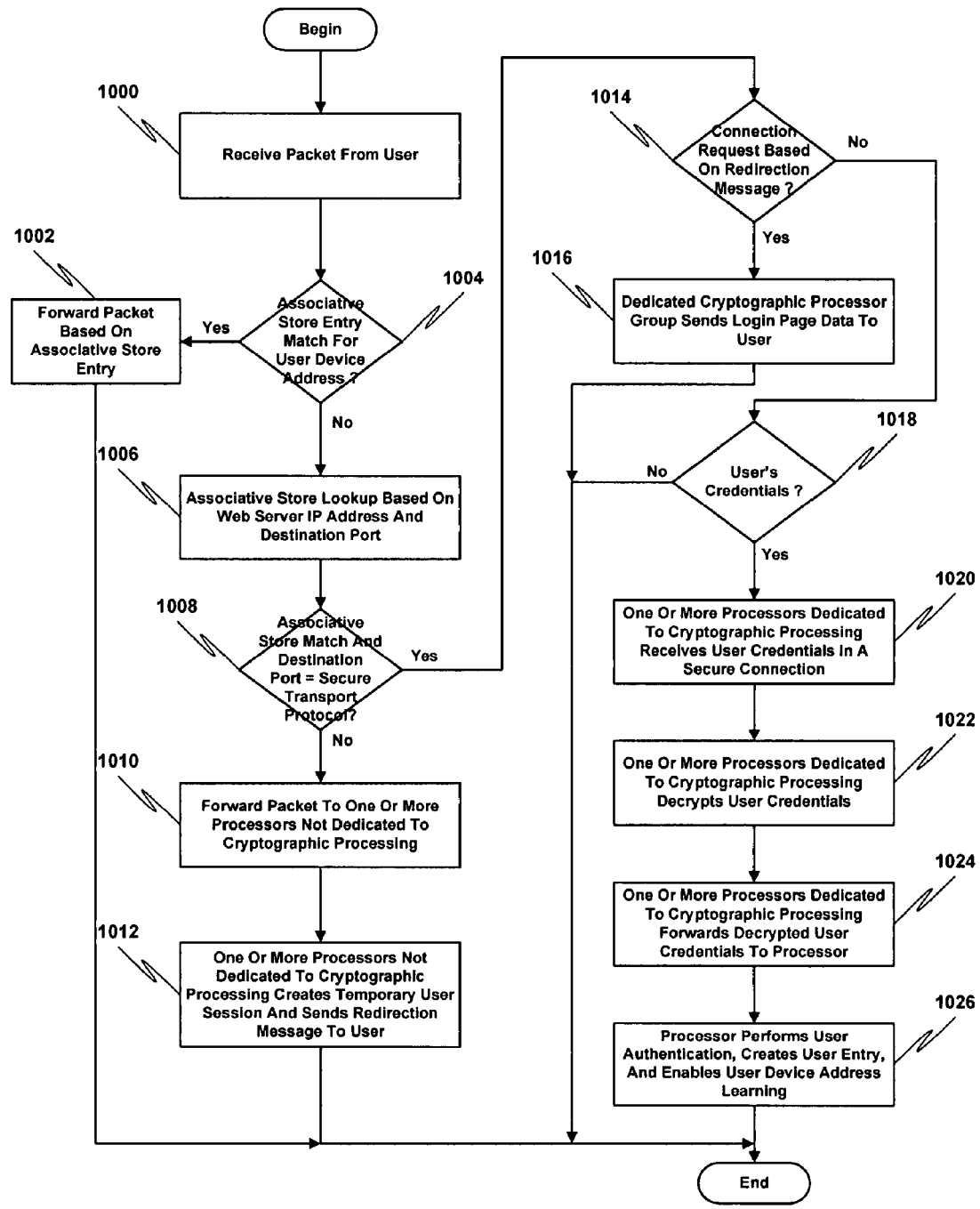
FIG. 10 is a flow diagram that illustrates a method for Web-based authentication in accordance with one embodiment of the present invention.

FIG. 10 is a flow diagram that illustrates a method for Web-based authentication in accordance with one embodiment of the present invention. The processes illustrated in FIG. 10 may be implemented in hardware, software, firmware, or a combination thereof. At 1000, a packet is received from a user device. At 1004, a determination is made regarding whether there is a associative store entry match for the user device address. An associative store entry match for the user device address indicates that the user device has been authenticated. At 1002, if there is an associative store entry match for the user device address, the packet is forwarded based on the associative store entry. At 1006, if there is not an associative store entry match for the user device address, an associative store lookup is done based on the destination IP address and the destination port of the packet. At 1008, a determination is made regarding whether (1) the destination IP address is the web server IP address and (2) the destination port indicates a secure transport protocol. If the destination IP address is not the web server IP address or the destination port does not indicate a secure transport protocol, at 1010 the packet is forwarded to one or more processors not dedicated to cryptographic processing. At 1012, the one or more processors not dedicated to cryptographic processing creates a temporary user session and sends a redirection message to the user. If at 1008 the destination port indicates a secure transport protocol, at 1014 a determination is made regarding whether the packet is associated with a connection request based on the redirection message sent at 1012. If the packet is associated with a connection request based on the redirection message sent at 1012, at 1016 the one or more processors dedicated to cryptographic processing sends a login page to the user. If the packet is not associated with a connection request based on the redirection message sent at 1018 a determination is made regarding whether the user's credentials are being provided. If at 1018 the users credentials are being provided, at 1020 the one or more processors dedicated to cryptographic processing receives the user credentials in a secure connection. At 1022, the one or more processors dedicated to cryptographic processing decrypts user credentials.

At 1024, the one or more processors dedicated to cryptographic processing forwards the decrypted user credentials to a processor configured to perform user authentication, create a user entry, and enable forwarding of packets directly from an input port to an output port if the packets are from a user device that has been authenticated. In the embodiment illustrated in FIG. 2, one of the processors not dedicated to cryptographic processing 206 performs these functions. In the embodiment illustrated in FIG. 3, master processor 340 performs these functions. In the embodiment illustrated in FIG. 4, master processor 440 performs these functions. At 1026, the processor receives the user credentials and performs user authentication, create a user entry, and enable forwarding of packets directly from an input port to an output port if the packets are from a user device that has been authenticated.

According to one embodiment of the present invention, one Web server IP address is shared by all Web servers handled by a multiprocessor network switch. A master processor of the network switch is configured to handle Internet Control Message Protocol (ICMP) requests and responses for the shared Web server IP address, thus conserving IP addresses and providing users with the appearance of a single Web server. Packet traffic flow is forwarded to particular processor(s) as discussed above.

According to another embodiment of the present invention, a multiprocessor network switch supports multiple virtual Web servers, allowing multiple Web servers in a multiple VLAN/subnet configuration. Similar to the single Web server configuration described above, users define different Web servers for different VLANs/subnets. Individual Web servers function as an individual Web server instance, responding to requests and responses. However, internally on a given processor of the network switch, all Web servers are bound to one real Web server. In other words, only one Web server is listening, using IP NAT (network address translation) and a tracking session to distinguish different flows. This embodiment is discussed in more detail below with respect to FIG. 11.

Figure 11:
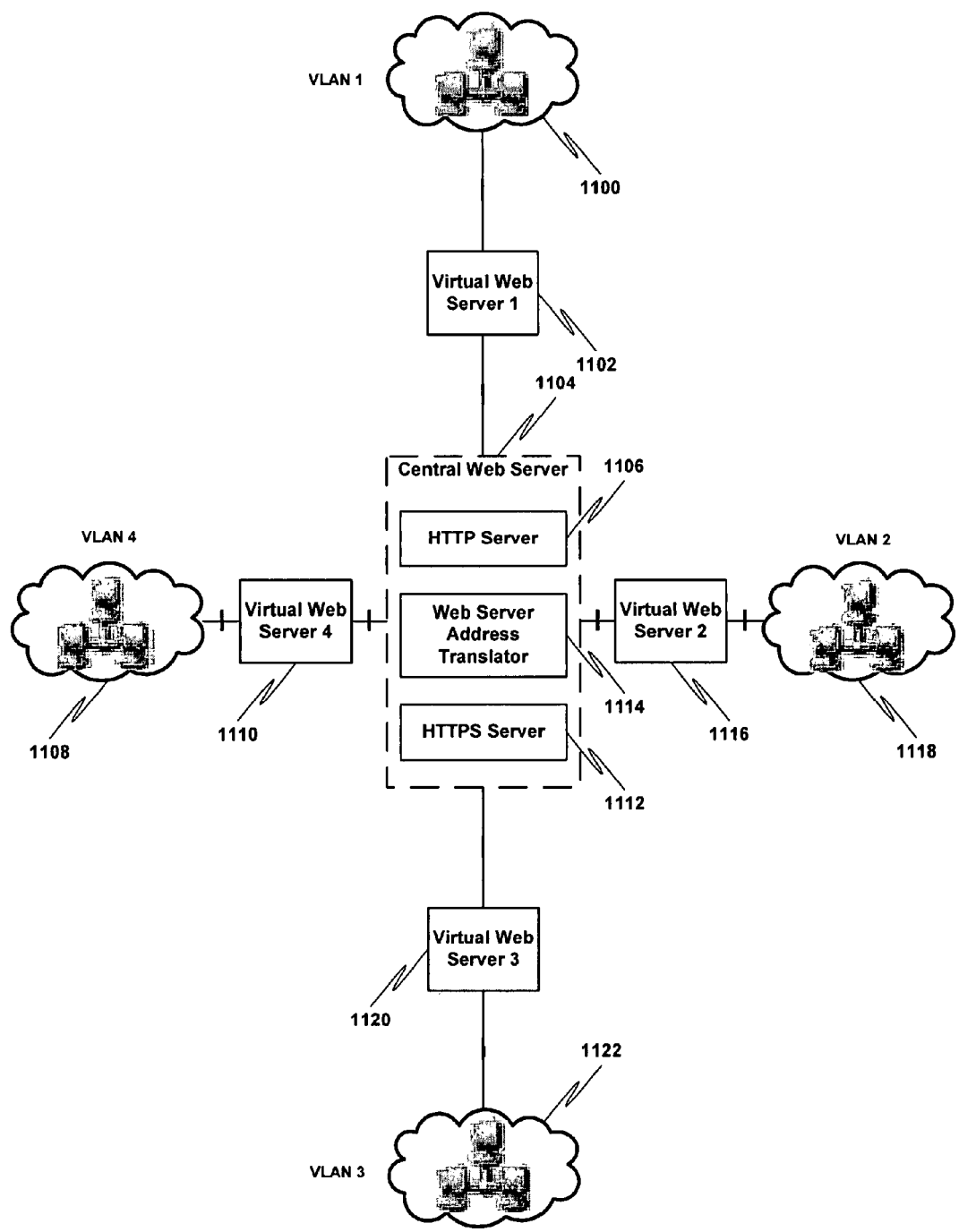
FIG. 11 is a block diagram that illustrates a scalable distributed architecture for Web-based multi-VLAN authentication in accordance with one embodiment of the present invention.

FIG. 11 is a block diagram that illustrates a scalable distributed architecture for Web-based multi-VLAN authentication in accordance with one embodiment of the present invention. As shown in FIG. 11, VLANs 1100, 1118, 1122, and 1108 interface with central Web server 1104 via virtual Web servers 1102, 1116, 1120, and 1110, respectively. Central Web server 1106 comprises an HTTP server 1106, an HTTPS server 1112, and a Web server address translator 1114. HTTP server 1106 is configured to handle communications using the HyperText Transfer Protocol (HTTP). HTTPS server 1112 is configured to handle communications using the HyperText Transfer Protocol Secure (HTTPS). Web server address translator 1114 is configured to use IP NAT.

Figure 12:
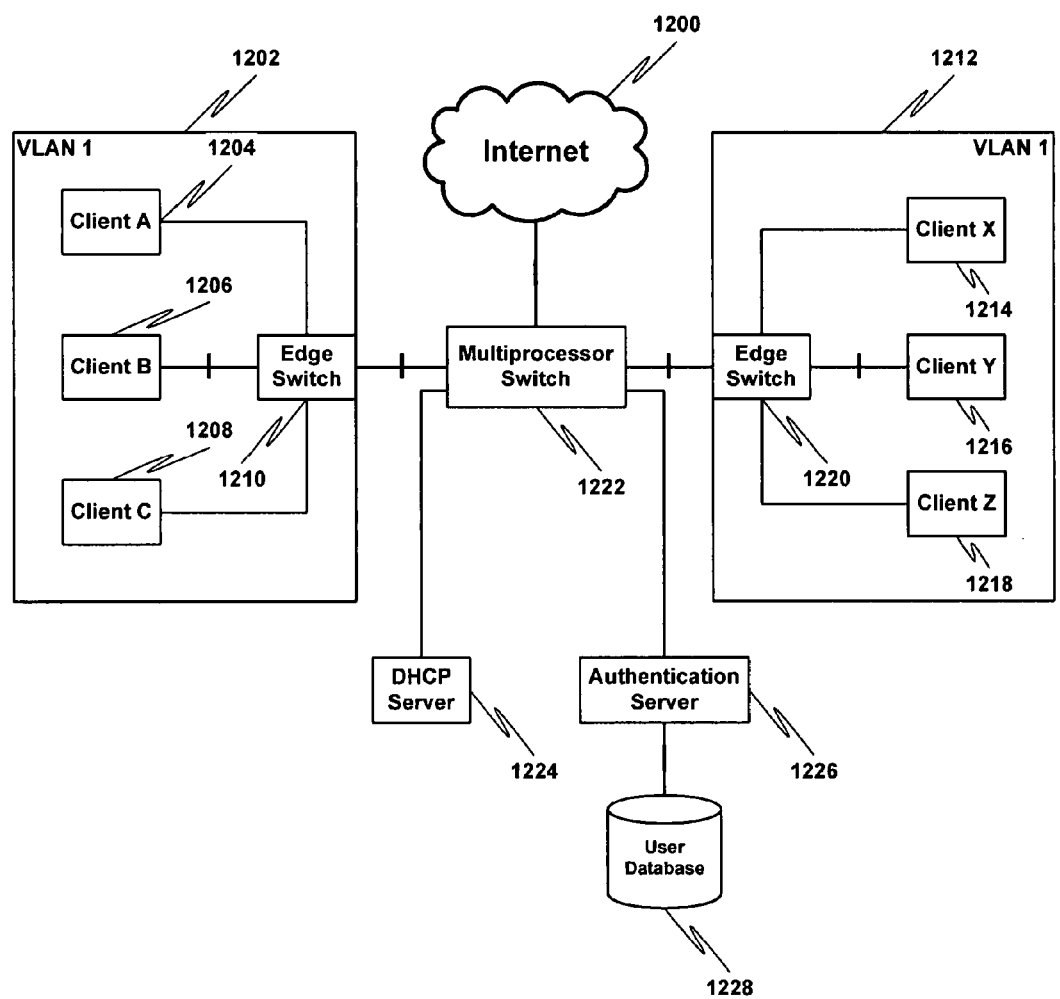
FIG. 12 is a block diagram that illustrates a scalable distributed architecture for Web-based multi-VLAN authentication on the aggregation layer in accordance with one embodiment of the present invention.

FIG. 12 is a block diagram that illustrates a scalable distributed architecture for Web-based multi-VLAN authentication on the aggregation layer in accordance with one embodiment of the present invention. As shown in FIG. 12, a multiprocessor network switch of the present invention is used at the aggregation layer to interface between the Internet 1200, and between VLANs 1202 and 1212 via edge routers 1210 and 1220 of VLANs 1202 and 1212, respectively.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method comprising:
    examining a packet in a network switch having at least one memory;
    associating the packet with a flow based on a result of applying network address translation (NAT) to a first information from the packet, the flow associated with one of a plurality of virtual local area networks (VLANs); and
    responsive to the associating,
        if a destination port of the packet indicates a secure transport protocol, forwarding, based at least in part on a second information from the packet, packet traffic for the flow to a first one or more processors of the switch that are dedicated to cryptographic processing; and
        if the destination port does not indicate a secure transport protocol, forwarding packet traffic for the flow to a second one or more processors of the switch.

2. The method of claim 1, wherein
the second one or more processors are not dedicated to cryptographic processing.

3. The method of claim 1, wherein the secure transport protocol comprises the Secure Sockets Layer (SSL).

4. The method of claim 1, further comprising hashing the packet to derive a result value.

5. The method of claim 1, wherein the second information comprises the destination port.

6. The method of claim 5, wherein the second information further comprises one or more of:
    a source port of the switch that received the packet,
    a source IP address, and
    a user device address.

7. The method of claim 6 wherein the user device address comprises a Medium Access Control (MAC) address.

8. The method of claim 1, wherein the examining further comprises receiving the packet via one of one or more input ports of the network switch, each of the one or more input ports associated with the at least one memory.

9. The method of claim 1, wherein the examining further comprises receiving the packet via one of one or more input ports of the network switch, each of the one or more input ports associated with a different one of the at least one memory.

10. The method of claim 1, further comprising:
    responsive to the associating, if a source of the packet is an authenticated user, forwarding the packet via an output port of the switch, based on the memory.

11. A nontransitory program storage device readable by a machine, embodying a program of instructions executable by the machine to perform a method, the method comprising:
    examining a packet in a network switch having at least one memory;
    associating the packet with a flow based on a result of applying network address translation (NAT) to a first information from the packet, the flow associated with one of a plurality of virtual local area networks (VLANs); and
    responsive to the associating,
        if a destination port of the packet indicates a secure transport protocol, forwarding, based at least in part on a second information from the packet, packet traffic for the flow to a first one or more processors of the switch that are dedicated to cryptographic processing; and
        if the destination port does not indicate a secure transport protocol, forwarding packet traffic for the flow to a second one or more processors of the switch.

12. A network switch comprising:
    a first one or more processors;
    a second one or more processors; and
    at least one memory;
    wherein the network switch is configured to:
        examine a packet in a network switch having at least one memory;
        associate the packet with a flow based on a result of applying network address translation (NAT) to a first information from the packet, the flow associated with one of a plurality of virtual local area networks (VLANs); and
        responsive to the associating,
            if a destination port of the packet indicates a secure transport protocol, forward, based at least in part on a second information from the packet, packet traffic for the flow to a first one or more processors of the switch that are dedicated to cryptographic processing; and
            if the destination port does not indicate a secure transport protocol, forward packet traffic for the flow to a second one or more processors of the switch.

13. The network switch of claim 12, wherein
the second one or more processors are not dedicated to cryptographic processing.

14. The network switch of claim 12, wherein the secure transport protocol comprises the Secure Sockets Layer (SSL).

15. The network switch of claim 12, wherein the network switch is further configured to hash the packet to derive a result value.

16. The network switch of claim 12, wherein the second information comprises the destination port.

17. The network switch of claim 16, wherein the second information further comprises one or more of:
    a source port of the switch that received the packet,
    a source IP address, and
    a user device address.

18. The network switch of claim 17 wherein the user device address comprises a Medium Access Control (MAC) address.

19. The network switch of claim 12, wherein the network switch is further configured to receive the packet via one of one or more input ports of the network switch, each of the one or more input ports associated with the at least one memory.

20. The network switch of claim 12, wherein the network switch is further configured to receive the packet via one of one or more input ports of the network switch, each of the one or more input ports associated with a different one of the at least one memory.

21. The network switch of claim 12 wherein the network switch is further configured to:
    responsive to the associating, if a source of the packet is an authenticated user, forward the packet via an output port of the switch, based on the memory.

\* \* \* \* \*